(12) United States Patent
Claudio

(10) Patent No.: US 8,162,467 B2
(45) Date of Patent: Apr. 24, 2012

(54) METHOD FOR THE UNIVOCAL MARKING OF MATERIALS, AND INK FOR CARRYING OUT THE SAME

(76) Inventor: Selva Claudio, Biella Pavignano (IT)

( * ) Notice: Subject to any disclaimer, the term of this patent is extended or adjusted under 35 U.S.C. 154(b) by 448 days.

(21) Appl. No.: 12/446,381

(22) PCT Filed: Nov. 16, 2007

(86) PCT No.: PCT/IT2007/000809
§ 371 (c)(1),
(2), (4) Date: Apr. 20, 2009

(87) PCT Pub. No.: WO2008/059552
PCT Pub. Date: May 22, 2008

(65) Prior Publication Data
US 2010/0321435 A1      Dec. 23, 2010

(30) Foreign Application Priority Data

| Nov. 16, 2006 | (IT) | ................ | BI2006A0010 |
| Dec. 4, 2006 | (IT) | ................ | BI2006A0013 |
| Feb. 21, 2007 | (IT) | ................ | BI2007A0002 |

(51) Int. Cl.
    *C09D 11/00*       (2006.01)

(52) U.S. Cl. ........... 347/100; 347/14; 347/101; 347/107
(58) Field of Classification Search .............. 347/100, 347/14, 101, 107
See application file for complete search history.

(56) References Cited

U.S. PATENT DOCUMENTS

| 6,060,426 | A | 5/2000 | Tan et al. | |
| 2005/0100204 | A1* | 5/2005 | Afzal et al. | ............ 382/135 |
| 2005/0239207 | A1 | 10/2005 | Gelbard | |
| 2006/0127670 | A1* | 6/2006 | Kinlen et al. | ............ 428/403 |

FOREIGN PATENT DOCUMENTS

| EP | 1246876 B | | 8/2003 |
| JP | 54092232 A | * | 7/1979 |
| WO | 00/20520 A | | 4/2000 |
| WO | 2006/056830 A | | 6/2006 |

* cited by examiner

*Primary Examiner* — Laura Martin
(74) *Attorney, Agent, or Firm* — David A. Guerra

(57) ABSTRACT

Described herein is a method for unique marking of various materials that can be obtained using an ink formulated with micronized microparticles and/or microencapsulated microdrops of various nature dispersed in a suitable vehicle; said ink, once applied to each individual product, forms an original and distinctive map.

20 Claims, 2 Drawing Sheets

US 8,162,467 B2

METHOD FOR THE UNIVOCAL MARKING OF MATERIALS, AND INK FOR CARRYING OUT THE SAME

CROSS-REFERENCE TO RELATED APPLICATIONS

Figure 1:
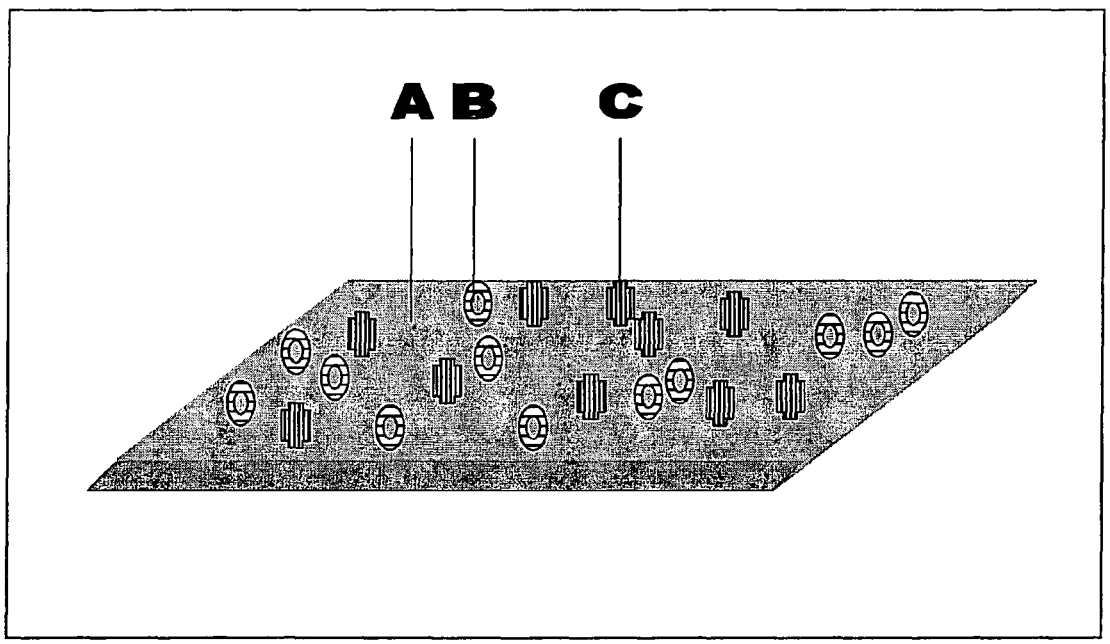

This application is an U.S. national phase application under 35 U.S.C. §371 based upon co-pending International Application No. PCT/IT2007/000809 filed on Nov. 16, 2007. Additionally, this U.S. national phase application claims the benefit of priority of co-pending International Application No. PCT/IT2007/000809 filed on Nov. 16, 2007, Italy Application No. BI2006A000010 filed on Nov. 16, 2006, Italy Application No. BI2006A000013 filed on Dec. 4, 2006 and Italy Application No. BI2007A000002 filed on Feb. 21, 2007. The entire disclosures of the prior applications are incorporated herein by reference. The international application was published on May 22, 2008 under Publication No. WO 2008/059552.

The present invention relates to the sector regarding means for identification and war against forgery, and more precisely to a system for unique marking of a product by means of an impression that is unrepeatable and impossible to reconstruct. According to the invention, this is made possible using, in the marking, an innovative ink that is characterized in that it comprises a vehicle, in which microparticles of various nature and/or microencapsulated microdrops of colour are mixed, which, during printing, under pressure, break up to form coloured and/or fluorescent and/or phosphorescent and/or reflecting spots or patches, that are original and distinct from one another as regards size and pattern and distribute randomly over the printing area, giving rise to a background map that proves unique and impossible to reconstruct given the randomness of its composition.

PRIOR ART

In recent times, on account of the globality in the production and marketing of products and on account of the movement of people from one continent to another, there has been an exponential increase in counterfeiting both of the products themselves and of the most famous brand names and trademarks, as well as of personal identity documents. As a result, there have arisen an extremely large number of new-generation anti-forgery systems and identification systems, such as, for example, magnetic labels, three-dimensional holographs, safety inks, RFID e-passports, fingerprints, iris scans, as well as facial biometrics. These systems are implemented using tools presenting high levels of technological and telematic innovation but prove vulnerable on account of their possible duplication, interception, or formulation, given that they are mainly mass-produced industrial products, which belong to known and accessible technologies and can in any case be copied or identified using appropriate equipment. Hence the need to find a simple and reliable method that is readily applicable at an industrial level, which is able to provide a unique imprinting (and hence guarantee uniqueness), which can be easily applied on the product and can be readily identified by means of an inspection of the product on which it can be applied.

PURPOSE OF THE INVENTION

The task of the present invention is to provide a method for rendering any product unique by means of a distinctive and irreproducible sign or marking for each individual print or entry. Said unique sign, which can be obtained at a negligible cost, must be able to attribute to each product on which it is applied a unique and identifying "fingerprint" (map or spotting), which can possibly be detected even using a mere palm-top, at any moment and in any place for a property check that provides total guarantee of originality.

The above has been obtained according to the present invention by envisaging that said marking will be obtained using an ink formulated with micronized particles and/or microencapsulated microdrops of various nature that are dispersed randomly in an appropriate basic vehicle. Said ink constitutes a further subject of the present invention.

In this way, a marking is obtained that is certainly unique, in the sense that it is impossible to reconstruct a "fingerprint" that has been previously obtained and filed because each micronized microparticle and/or microencapsulated microdrop that can be detected is able of leave in each individual print a specific colouring and/or an identifying spotting that are original in terms of irregularity and randomness both in terms of shape (size and edge pattern) and in terms of distribution in a given space.

The unique marking that forms the subject of the present invention is an optimal solution that is able to defend the product and the brand name. It differs from serial anti-forgery as regards its peculiarity of providing an unrepeatable and original sign, that is impossible to reconstruct, which, if copied or imitated, is patently recognizable as being a forgery.

Advantageously, the method of unique marking forming the subject of the present invention is not only surprisingly simple, inexpensive, and applicable on any type of industrial production line, but can also be detected by an end user with an appropriate technical kit in various sectors of marketable goods.

DESCRIPTION OF THE INVENTION

Further characteristics and advantages of the present invention will emerge clearly from the ensuing detailed description, with reference to the attached plates of drawings, which represent, purely by way of non-limiting example, a preferred embodiment thereof.

Figure 2:
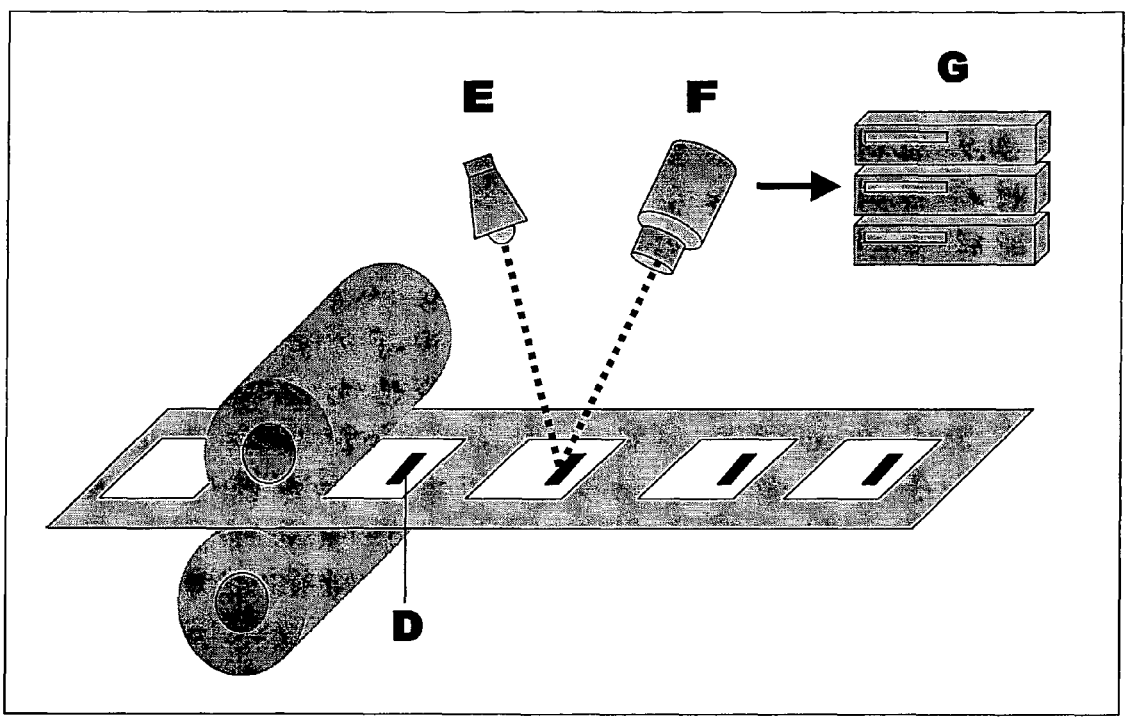

In the plates of drawings:

FIG. 1 is a schematic representation of the step of mixing of the ink for the marking; and FIG. 2 is a schematic representation of the steps of printing and reading, as well as filing of the signs impressed on the product to be marked.

With reference to FIG. 1, as first step of the method of unique marking according to the present invention, an ink is produced, made up of an appropriate vehicle A, which is mixed to microencapsulated microdrops B and/or micronized microparticles C, which range from 40 µm to 80 µm in diameter. During mixing, the micronized microparticles and/or microencapsulated microdrops are distributed randomly in the basic vehicle, thus creating a background differentiation or map D for each square centimeter, as illustrated in FIG. 2.

In the next step of the method of unique marking according to the present invention, printed on the product using this particular ink is a sign of approximately one square centimeter, also comprised in which is a progressive filing number that will be illuminated (FIG. 2) in a subsequent phase, under ambient light or by means of a beam or a pencil E of white light, ultraviolet (UV) light, cold light, invisible or black light, cinereous light, anthelic light, laser light, zodiacal light, monochromatic light and polychromatic light, namely, the different lights that exist added together and, by means of a series of appropriate filters, which are designed to highlight the background map of the sign entered. Illumination of the printed sign brings out fully the randomness of distribution, and the shape and size of the micronized microparticles and/or microencapsulated microdrops, thus creating each time an unrepeatable and differentiated background map. The unique reading and filing datum that can be obtained from the background map is represented by determining the colour, size, and positioning even of just a few micronized microparticles and/or microencapsulated microdrops within the sign entered.

More in particular, the background map can be obtained from the format, two-dimensionality, size, pattern, colour range, reflectance, transparency, colour dispersion, macrophotograph, numerics, density, luminance and all those combinations that can determine a unique datum and that can be detected with reading instruments, or additional lenses, or filters.

The above reading datum is first filtered by a dark lens, in order to neutralize and inhibit any possible reflectance due to distortion and disturbance of the patterns, and can be then detected by an optical-to-digital telecamera F (FIG. 2), connected to a software with a viewing device that can transmit said datum to a database G (FIG. 2) for future comparison and confirmation of authenticity regarding the previously marked product.

Using the same process outlined above, it is possible to detect remotely, by means of a purposely designed portable device, the same datum previously obtained and compare it in real time for a verification of authenticity with the original matrix, recalled, thanks to an alphanumeric encoding, from a filing database.

In practice, it will be possible in any case to vary certain details of implementation of the method according to the present invention described above using known techniques in order to adapt said method more suitably to the type of printing, to different materials and/or products (fabric, paper, metal, wood, glass, various plastic materials) on which printing is to be carried out, and/or to the type of machinery with which the unique marking is applied and detected.

In the case, for example, of an oleographic marking that can be applied to paper documents, as first step an ink is prepared, using a phenol-based transparent vehicle and a sheet of polyester having a thickness of 50 μm, which can be spotted by spraying with a phosphorescent pigment which reacts to light detection, such as, for example, phosphorite, and then be micronized according to known techniques. Micronization breaks down the polyester film in an irregular way, thus creating microscopic particles of approximately 80 μm in diameter, which are partially spotted and are irregular both as regards volume and as regards in outer perimeter so that they are all rendered differentiated and unique.

At this point, the process entails entry, detection, and filing of the unique datum on the product to be marked. The micronized microparticles are applied on said product by being mixed with an appropriate basic transparent vehicle for printing, which affords a strong anchorage as well as fast drying and can undergo a subsequent impression with a small sign combined with a progressive filing number. The sign is then flashed with a cold white light, which highlights fully a background geometrical luminous map due to the reactive lighting-up of the micronized microparticles partially spotted with fluorine and to their random distribution. This background map is immediately detected with an optical telecamera, which converts it into a digital datum and transmits it to a filing database for future comparison of uniqueness. If at a future date it were to become necessary to check the originality of the product on which the sign of uniqueness has been impressed applying the method of the present invention, this could be done using a portable optical-to-digital reader that is able of create the same form of detection of the background datum and that is able to compare it with the one previously filed.

In the case, for example, of offset or flexographic printing on paper or other medium, as first step the ink is produced with a transparent or coloured basic vehicle of various nature according to the print, and mixed therein are microencapsulated microdrops of colour to which micronized microparticles of natural carbon graphite may possibly be added. The pressure of the rollers that distribute the ink will break up the coloured microencapsulated microdrops, randomly distributed in the vehicle, to form coloured patches of different size and shape, which, possibly with the addition also of micronized microparticles of carbon graphite, can create a datum with a background map that is unique, unrepeatable, visible, and detectable using a telecamera. The datum can then be saved in digital format, processed, and filed using a software in a database for comparison of authenticity in a future remote reading operation. The background map can in any case be obtained from the format, two-dimensionality, size, pattern, colour range, reflectance, transparency, colour dispersion, macrophotograph, numerics, density, luminance and all those combinations that can determine a unique datum and that can be detected using any reading instrument, or additional lenses, or filters.

Another subject of the present invention is represented by the use of the method of unique marking described above in the usual processes of reliefgraphic printing, planegraphic printing, engrave-graphic printing, permeographic printing, flexographic printing, serigraphic printing, areographic printing, tampographic printing, heat-transfer printing, namely, all those methods that can be used for applying a sign or a marking.

The unique-marking method according to the present invention can be obtained using the ink that constitutes a further subject of the invention.

More in particular, the ink according to the present invention is made up of an organic or inorganic basic vehicle, known in the art, for printing and can be in liquid form or paste form, coloured or transparent, presenting different types of anchorage and drying according to the type of product on which it is to be applied and to the very type of printing used, possibly mixed with mineral oils, pigments, additives, alcohols, drying varnishes, hydrocarbons, natural and synthetic resins, glycolides or any product suitable for mixing, distribution and application of micronized microparticles and/or microencapsulated microdrops on different marketable goods. To the vehicle described above it is possible to mix:

a) micronized microparticles that can be obtained, with methods known to the art, from carbon graphite, oleographs, ebonite, inorganic iron oxides, paper, various plastic materials, natural or artificial fibres, fluorescent, phosphorescent, luminescent, reflectant and UV materials, and/or b) microencapsulated microdrops of colour that can be obtained with methods known in the art, which are able to break up when subjected to mere pressure, releasing and expanding the colour in the vehicle and hence on the micronized microparticles possibly present therein.

Another subject of the present invention envisages the use of the ink described above for unique marking of a product.

Provided hereinafter, purely by way of description, is a non-limiting example of the method of unique marking according to the present invention.

EXAMPLE

Described in what follows is the method for unique marking on a label on a graphic printing line.

In the first step, an ink made up of a predominantly phenolic transparent vehicle for graphic printing is produced, in which there are dispersed by being mixed micronized microparticles of phosphorite and microencapsulated microdrops of colour. In the next step, with this particular ink, a sign of approximately one square centimeter will be printed on the label and will be then illuminated by a simple white LED light. Lighting-up of the printed sign brings out fully the randomness of distribution of the micronized microparticles and of the microencapsulated microdrops, each time creating an unrepeatable and differentiated background map. The unique reading and filing datum, which is obtained from the background map, is given by the size, colour and positioning of just a few micronized microparticles (7-10 particles per square centimeter) within the perimeter of the printed sign. Said micronized microparticles hence constitute a unique two-dimensional code, which cannot be reproduced even at a production level, given the intrinsic randomness of the phenomenon of deposition of the micronized microparticles. Finally, this code is decoded using appropriate artificial-viewing techniques and is read by a first viewing system on the printing line with an optical-to-digital telecamera of very high resolution, which translates the sign and stores it in an appropriate logic format, and sends it to a server. In the next step, by means of a specific software, the server carries out decoding and stores the codes in a database with the possibility of them being transferred also onto a physical medium (CD, DVD, USB-memory, HD, etc.). The data filed will serve for a future comparison and confirmation of authenticity on the product on which the label will be applied. Using the same procedure set forth above, it will be possible to detect remotely, by means of a purposely designed portable apparatus or a mere palm-top, the same code previously formed and filed and compare it in real time by sending it telematically, via satellite, or via the Internet, for a verification of authenticity with the original matrix recalled, thanks to a software and a coding, from the filing database for comparison and verification of the originality of the background datum.

The invention claimed is:

1. A method for unique marking of material, said method comprising the steps:
   a) providing an ink for marking a product to be rendered unique, said ink comprising a vehicle suitable for printing, and microparticles mixed with said vehicle so as to be distributed randomly, said microparticles each having a diameter substantially 25 µm to 80 µm;
   b) printing a sign on said product using said ink by applying said ink to said product using at least one roller, said sign being substantially at least one centimeter square, said sign comprising a progressive filing number for storage in a central database, wherein said roller breaks up said microparticles, randomly distributed in said vehicle, to form patches of different size and shape;
   c) illuminating said sign, thereby highlighting fully the randomness of distribution of said microparticles, and the shape and size of the microparticles, thus creating an unrepeatable and differentiated background map for said sign;
   d) filtering a reading datum consisting of said background map using a dark lens in order to neutralize and inhibit any possible reflectance of distortion and disturbance of the patterns; and
   e) detecting said reading datum filtered from step d), by means of an optical-to-digital telecamera in communication with software with a viewing device, which transmits said filtered reading datum to a database for future comparison and confirmation of authenticity on said product marked with said ink.

2. The method according to claim 1, wherein said microparticles being at least one micronized microparticle.

3. The method according to claim 1, wherein said microparticles being at least one microencapsulated microdrop.

4. The method according to claim 1, wherein said microparticles being at least one micronized microparticle and at least one microencapsulated microdrop.

5. The method according to claim 1, wherein said background map is obtained from a format selected from the group consisting of two-dimensionality, size, pattern, color range, reflectance, transparency, color dispersion, macrophotograph, numerics, density, and luminance.

6. The method according to claim 5, wherein said step c) of illuminating said sign is obtained from an illumination source selected from the group consisting of ambient light, a beam, a pencil of white light, ultraviolet (UV) light, cold light, invisible light, black light, laser light, zodiacal light, monochromatic light, and polychromatic light.

7. The method according to claim 6, wherein said reading datum obtained from said background map of said microparticles is adapted to be read, detected, filed and compared using telematic technologies and high-definition viewing systems, and further comprising filters, lenses, and means for sending data.

8. The method according to claim 6, wherein said step b) of printing a sign on said product using said ink is obtained from a printing method selected from the group consisting of reliefgraphic printing, planegraphic printing, engravegraphic printing, permeographic printing, flexographic printing, serigraphic printing, areographic printing, tampographic printing, and heat-transfer printing.

9. The method according to claim 1, wherein said vehicle of said ink being made of a material selected from the group consisting of an organic, an inorganic basic vehicle, a liquid basic vehicle, a paste basic vehicle, a colored basic vehicle, and a transparent basic vehicle.

10. The method according to claim 9, wherein said microparticles being colored, and are adapted to break up when subjected to pressure, releasing and expanding the color in said vehicle.

11. The method according to claim 10, wherein said microparticles are selected from the group consisting of carbon graphite, oleographs, ebonite, inorganic iron oxides, paper, plastic materials, natural or artificial fibres, fluorescent, phosphorescent, luminescent, reflectant materials, and UV materials.

12. The method according to claim 11, wherein said ink further comprising at least one additional vehicle selected from the group consisting of mineral oils, pigments, additives, alcohols, drying varnishes, hydrocarbons, natural and synthetic resins, and glycolides.

13. A method for unique marking of a product, said method comprising the steps:
   a) providing an ink for marking a product to be rendered unique, said ink comprising a vehicle suitable for printing, micronized microparticles, and microencapsulated microdrops, said micronized microparticles and microencapsulated microdrops each having a diameter substantially 25 µm to 80 µm;
   b) mixing said micronized microparticles and said microencapsulated microdrops with at least said vehicle so as to randomly disperse said micronized microparticles and microencapsulated microdrops in said vehicle to produce said ink, c) applying at least a portion of said ink on said produce to produce a sign, said sign being substantially at least one centimeter square, said sign comprising a progressive filing number for storage in a central database;

d) illuminating said sign, thereby highlighting fully the randomness of distribution of said micronized microparticles and said microencapsulated microdrops, and the shape and size of said micronized microparticles and said microencapsulated microdrops, thus creating an unrepeatable and differentiated background map for said sign;

e) filtering a reading datum consisting of said background map using a dark lens in order to neutralize and inhibit any possible reflectance of distortion and disturbance of randomness of distribution of said micronized microparticles and said microencapsulated microdrops;

f) detecting said reading datum filtered from step e) by means of an optical-to-digital telecamera in communication with software with a viewing device;

g) converting said reading datum detected in step f) to a digital datum; and h) transmitting said digital datum to a database for future comparison and confirmation of authenticity on said product marked with said ink.

14. The method according to claim 13, wherein said background map is obtained from a format selected from the group consisting of two-dimensionality, size, pattern, color range, reflectance, transparency, color dispersion, macrophotograph, numerics, density, and luminance.

15. The method according to claim 14, wherein said step d) of illuminating said sign is obtained from an illumination source selected from the group consisting of ambient light, a beam, a pencil of white light, ultraviolet (UV) light, cold light, invisible light, black light, laser light, zodiacal light, monochromatic light, and polychromatic light.

16. The method according to claim 15, wherein said step c) of applying a portion of said ink on said product is obtained from a printing method selected from the group consisting of reliefgraphic printing, planegraphic printing, engravegraphic printing, permeographic printing, flexographic printing, serigraphic printing, areographic printing, tampographic printing, and heat-transfer printing.

17. The method according to claim 16, wherein said vehicle of said ink being made of a material selected from the group consisting of an organic basic vehicle, an inorganic basic vehicle, a liquid basic vehicle, a paste basic vehicle, a colored basic vehicle, and a transparent basic vehicle.

18. The method according to claim 17, wherein said microencapsulated microdrops are colored, and are adapted to break up when subjected to pressure, releasing and expanding the color in said vehicle and on said micronized microparticles, and wherein said micronized microparticles are selected from the group consisting of carbon graphite, oleographs, ebonite, inorganic iron oxides, paper, plastic materials, natural or artificial fibres, fluorescent, phosphorescent, luminescent, reflectant materials, and UV materials.

19. The method according to claim 18, wherein said ink further comprising at least one additional vehicle selected from the group consisting of mineral oils, pigments, additives, alcohols, dying varnishes, hydrocarbons, natural and synthetic resins, and glycolides.

20. A uniquely marked product system comprising:
a product having a surface;
at least one sign printable to said surface of said product, said sign being substantially at least one centimeter square, said sign comprising at least an ink material, said ink comprising a vehicle suitable for printing, micronized microparticles, and microencapsulated microdrops, said micronized microparticles and said microencapsulated microdrops being randomly dispersed in said vehicle to produce a background map;
an illumination source adapted to illuminate said background map, and a progressive filing number of said sign on said product;
a dark lens adapted to filter a reading datum consisting of said background map, and to neutralize and inhibit any possible reflectance of distortion and disturbance of randomness of distribution of said micronized microparticles and said microencapsulated microdrops; and
an optical-to-digital telecamera adapted to detect said reading datum filtered from said dark lens;
wherein said micronized microparticles and microencapsulated microdrops each having a diameter substantially 25 µm to 80 µm.

* * * * *